United States Patent [19]
Itoh et al.

[11] Patent Number: 5,490,284
[45] Date of Patent: Feb. 6, 1996

[54] SATELLITE/LAND MOBILE COMMUNICATION SYSTEM INTEGRATION SCHEME

[75] Inventors: Yasuhiko Itoh, Tokyo; Toshio Mizuno, Sayama; Hideo Kobayashi, Fujimi; Hiroyasu Ishikawa, Warabi, all of Japan

[73] Assignee: Kokusai Denshin Denwa Kabushiki Kaisha, Tokyo, Japan

[21] Appl. No.: 247,325

[22] Filed: May 23, 1994

[30] Foreign Application Priority Data

May 27, 1993 [JP] Japan .................................. 5-146789

[51] Int. Cl.[6] .............................. H04B 7/26; H04Q 7/20
[52] U.S. Cl. ...................... 455/11.1; 455/13.1; 455/33.1; 455/54.1; 455/56.1; 455/127
[58] Field of Search ..................... 455/12.1, 11.1, 455/13.1–13.4, 15, 16, 20, 33.1, 54.1, 56.1, 127; 379/59, 60

[56] References Cited

U.S. PATENT DOCUMENTS

| | | | |
|---|---|---|---|
| 5,081,703 | 1/1992 | Lee | 455/13.1 |
| 5,163,158 | 11/1992 | Tendler et al. | 455/11.1 |
| 5,287,541 | 2/1994 | Davis et al. | 455/12.1 |

*Primary Examiner*—Chi H. Pham
*Attorney, Agent, or Firm*—Emmanuel J. Lobato

[57] ABSTRACT

Through utilization of a transportable earth station capable of communicating with both of a mobile satellite communication system and a terrestrial based mobile communication system and a portable terminal which is capable of radio communication with the transportable earth station and used in the terrestrial based mobile communication system, it is possible to communicate with both of the terrestrial based mobile communication system and the mobile satellite communication system by only one portable terminal in a wide variety of communication environments.

2 Claims, 5 Drawing Sheets

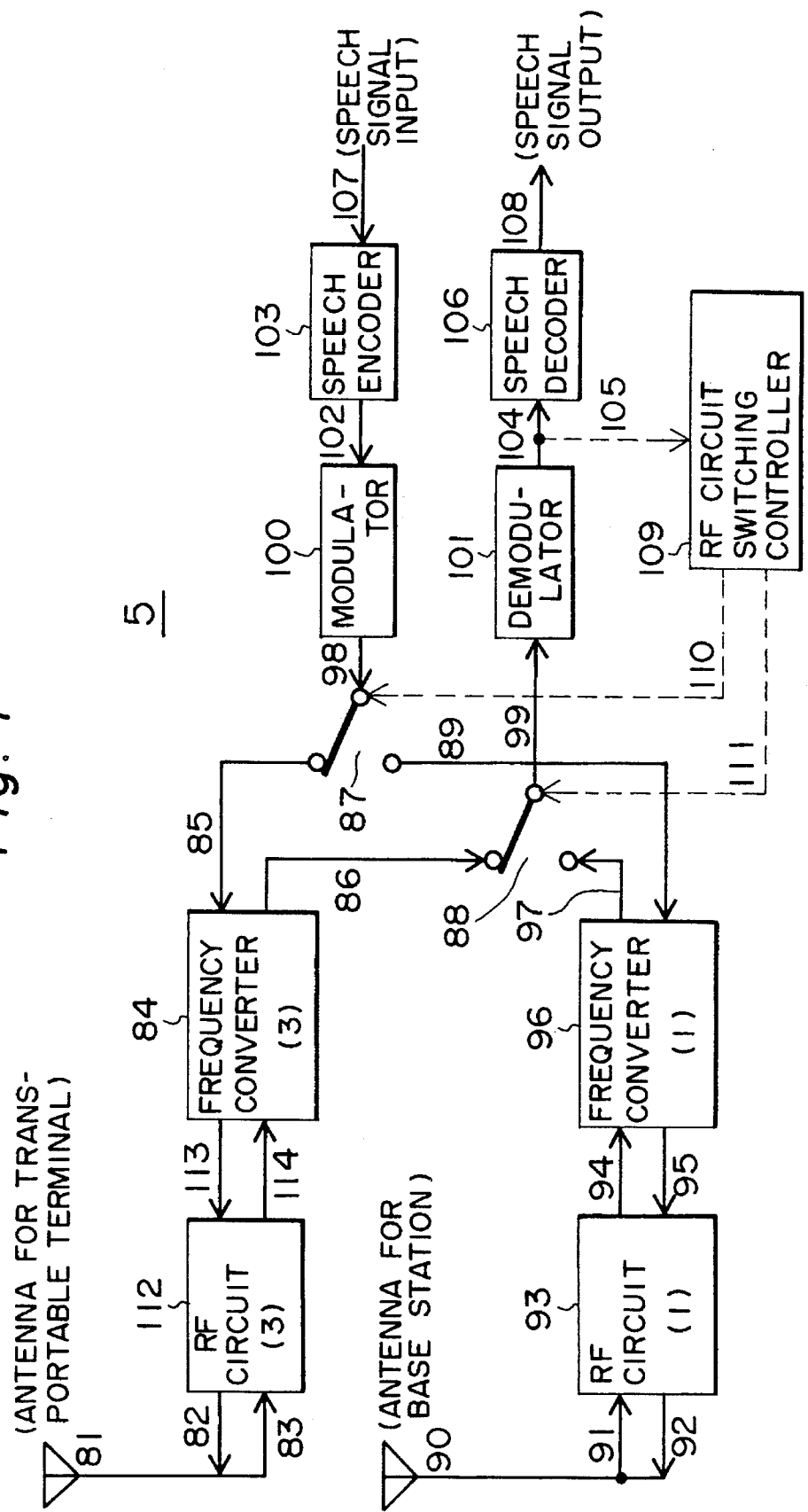

SATELLITE/LAND MOBILE COMMUNICATION SYSTEM INTEGRATION SCHEME

BACKGROUND OF THE INVENTION

The present invention relates to mobile radio communication systems such as a land mobile communication system, a mobile satellite communication system, a digital land mobile satellite communication system, a digital land mobile communication system and a digital mobile satellite communication system.

Conventionally, a transportable earth station of the mobile satellite communication system and a portable terminal of the terrestrial based mobile communication system are independent of each other, and the air interface between the satellite and the transportable earth station and the air interface between the base station and the portable terminal of the terrestrial based mobile communication system differ from each other. On this account, to use both of the mobile satellite communication system and the terrestrial based mobile communication system, it is necessary to prepare the transportable earth station for the mobile satellite communication system and the portable terminal for the land mobile communication system independently of each other. One possible method that has been proposed as a solution to this problem is to use a dual-mode mobile terminal which functions both as the transportable earth station for the mobile satellite communication system and the portable terminal for the land mobile communication system. In urban areas the dual-mode mobile terminal accesses a base station of the terrestrial based mobile communication system to communicate with a terrestrial based fixed network, whereas in areas outside the service area of the terrestrial based mobile communication system, such as sub-urban areas and hilly or mountaineous districts, it accesses the satellite to communicate with the terrestrial based fixed network. This permits communication from anywhere in the world through the use of just one dual mode mobile terminal.

The conventional systems have such problems as listed below.

(1) The mobile terminal for the land mobile communication and the transportable earth station for the mobile satellite communication system are required to stay within the areas where to be visible from the base station and the satellite, respectively. Accordingly, when these terminals are used indoors, the mobile terminal or transportable earth station must be brought to a place where it is visible from the base station and the satellite so as to receive signals from either one of them.

(2) In case of using the dual-mode terminal for mobile satellite and terrestrial based communications, it is necessary that the mobile terminal having a scale larger than that for an ordinary land mobile communication system be carried at all times even in the service area of the terrestrial based mobile communication system wherein no communications with the satellite are needed. Hence, the conventional dual-mode terminal conspicuously lacks ease of use.

(3) In case of using the mobile satellite communication system, it is necessary to hold the satellite visible from the transportable earth station at all times; hence, restrictions are imposed on the site of placement of the earth station.

SUMMARY OF THE INVENTION

An object of the present invention is to provide an excellent satellite/land mobile communication system integration scheme for a communication system which obviates the above-mentioned defects of the prior art, always allows both of the mobile satellite communication system and the terrestrial based mobile communication system to be accessed with only one mobile terminal, and hence is highly excellent in the transportability and ease of use of the mobile terminal.

The afore-mentioned problems of the prior art can be solved by the present invention which adopts the following characterized techniques of the present invention.

That is, in a mobile communication system which is made up of a transportable earth station allowed to communicate with the mobile satellite communication system and the terrestrial based mobile communication system and a portable terminal which is used in the terrestrial based mobile communication system allowed to radio-communicate with the transportable earth station, communications between the portable terminal and the transportable earth station are performed using an interface identical with a radio interface used in the terrestrial based mobile communication system; when the portable terminal is capable of communicating with a base station of the terrestrial based mobile communication system, the communication takes place using ordinary transmitting power, whereas when the portable terminal cannot communicate directly with the base station of the terrestrial based mobile communication system, the portable terminal is connected, using a very weak radio wave, to the transportable earth station to communicate therethrough with the base station of the land mobile communication system. It must be noted here that the interface, which is used for communication between the portable terminal and the transportable earth station as mentioned above, is exactly identical with the radio interface of the terrestrial based mobile communication system in terms of at least an access method, data transmission rate, frame structure, slot timing, modulation method, speech coding method, error control method and so forth which are needed for radio communication between two stations.

Furthermore, when the portable terminal or transportable earth station happens to stay outside the cell or zone covered by a respective base station of the land mobile communication system and perform communication through a satellite of the mobile satellite communication system, the portable terminal is connected by a very weak radio wave to the transportable earth station to communicate therethrough with the mobile satellite communication system. Thus, it is possible, with only one portable terminal, to communicate with both of the terrestrial based mobile communication system and the mobile satellite communication system.

BRIEF DESCRIPTION OF THE DRAWINGS

The present invention will be described in detail below with reference to the accompanying drawings, in which:

FIG. 7 is a diagram illustrating an example of the construction of a portable terminal for use in the satellite/land mobile communication system integration scheme according to the present invention.

DETAILED DESCRIPTION

The principle of the present invention will be at first described.

Figure 1:
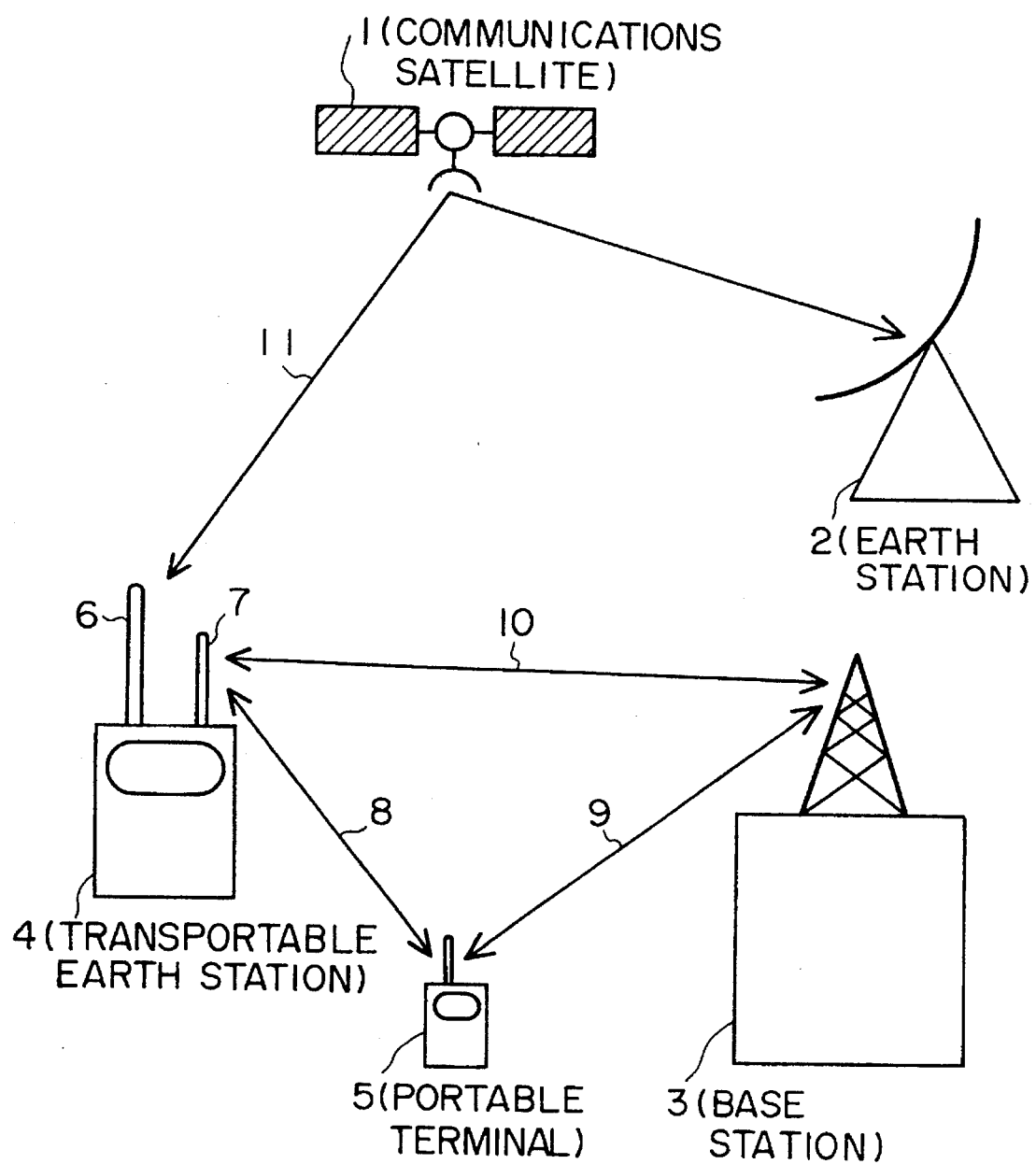
FIG. 1 is a diagram illustrating the concept of the system configuration of the satellite/land mobile communication system integration scheme according to the present invention.

With reference to FIG. 1 being a conceptual showing of the satellite/land mobile communication system integration scheme according to the present invention, reference numeral 1 denotes a communications satellite for use in the mobile satellite communication system, 4 a transportable earth station capable of accessing both of the mobile satellite communication system and the terrestrial based mobile communication system, 2 a land or earth station for communication with the transportable earth station 4 through the communications satellite 1, 3 a base station of the terrestrial based mobile communication system, and 5 a portable terminal capable of accessing both of the base station 3 of the terrestrial based mobile communication system and the transportable earth station 4. Reference numerals 8, 9 and 10 denote radio sections between the portable terminal 5 and the transportable earth station 4, between the portable terminal 5 and the base station 3 of the terrestrial based mobile communication system, and between the transportable earth station 4 and the base station 3 of the terrestrial based mobile communication system, respectively. In these ratio sections the same air interface of the terrestrial based mobile communication system is used. That is, the radio interface of the portable terminal 5 is one that conforms to the terrestrial based mobile communication system. Besides, the transmission between the portable terminal 5 and the transportable earth station 4 is performed by very weak power for which no radio station license is required, and the transmission between the portable terminal 5 and the base station 3 of the terrestrial based mobile communication system and between the transportable earth station 4 and the base station 3 of the terrestrial based mobile communication system is done by sending power which is granted for an ordinary terrestrial based mobile communication system. The sending power switching is carried out automatically or manually.

In FIG. 1, when a user of the portable terminal 5 moves in the service area of the terrestrial based mobile communication system, he uses the portable terminal 5 to access the base station 3 of the terrestrial based mobile communication system with ordinary sending power and perform communication. Next, when the user of the portable terminal 5 stays in a room of a building or the like which is in the service area of the terrestrial based mobile communication system but where no signals can be received directly from the base station 3, the transportable earth station 4 is placed at a site where communication with the base station 3 is allowed, and the transportable earth station 4 receives an access signal from the portable terminal 5 by a very weak radio wave through a transmit/receive antenna 7 for the terrestrial based mobile communication system and transmits the signal to the base station 3 after amplifying the signal power, thus enabling the portable terminal 5 to access and communicate with the terrestrial based mobile communication system. Conversely, a signal from the base station 3 or a control station of terrestrial based mobile communication system is received by the antenna 7 of the transportable earth station 4, from which it is sent as a very weak radio wave to the portable terminal 5.

As regards the mobile satellite communication system, the portable terminal 5 is similarly allowed to access and communicate with the satellite 1 invisible from the portable terminal user via the transportable earth station 4 placed at a position where the satellite 1 is visible, while at the same time signals from the satellite 1 to the portable terminal 5 can also be received via the transportable earth station 4. In this instance, however, the antenna 7 is used for communication between the portable terminal 5 and the transportable earth station 4 and an antenna 6 for communication between the transportable earth station 4 and the satellite 1.

On the other hand, when the user of portable terminal 5 moves outside the service area of the terrestrial based mobile communication system, he is capable of mobile communication with a terrestrial network via the satellite 1 by carrying the transportable earth station 4 with him. Moreover, by placing the transportable earth station 4 at a position where it is visible from the satellite 1, satellite communications can be performed using the portable terminal 5 of excellent mobility in the area where communications are allowed between the transportable earth station 4 and the portable terminal 5. In this instance, the antenna 7 is used for communication between the portable terminal 5 and the transportable earth station 4 and the antenna 6 for communication between the transportable earth station 4 and the satellite 1.

FIGS. 2 through 5 illustrate embodiments of the satellite/land mobile communication system integration scheme according to the present invention.

Figure 2:
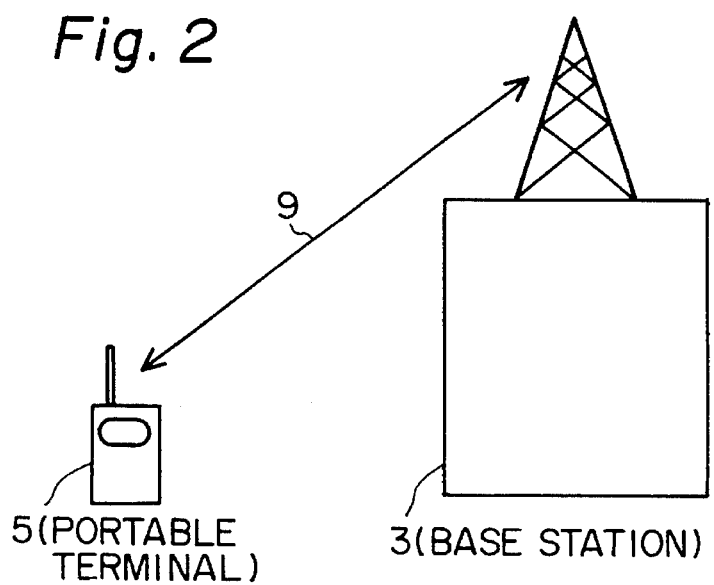
FIG. 2 is a diagram illustrating an embodiment of the satellite/land mobile communication system integration scheme according to the present invention when it is applied to a terrestrial based mobile communication system.

FIG. 2 shows the mode of communication by this invention system in case of using the portable terminal 5 in the terrestrial based mobile communication system. In FIG. 2, the portable terminal 5 is an ordinary portable unit which is conformable to the specifications of the terrestrial based mobile communication system, and it performs communications by prescribed transmitting power via the base station 3 and radio channel 9 of the terrestrial based mobile communication system while moving in the service area.

Figure 3:
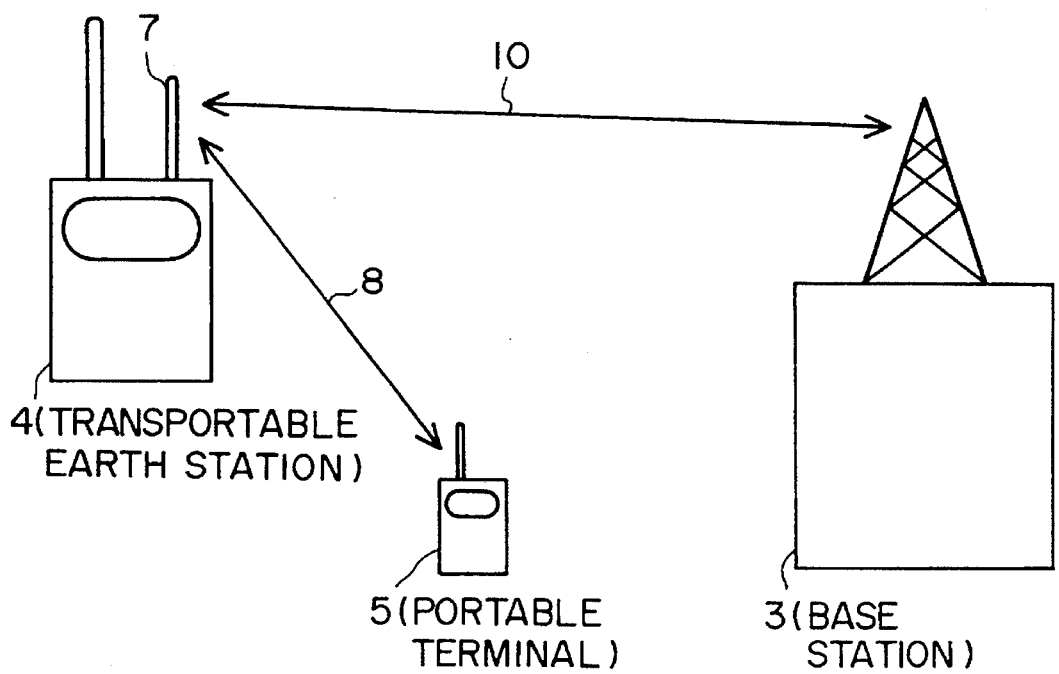
FIG. 3 is a diagram illustrating another embodiment of the satellite/land mobile communication system integration scheme according to the present invention when it is used in a room or similar situation where usual terrestrial based mobile communication system cannot be used.

FIG. 3 shows an example of application of this invention system in a case where since the user of portable terminal stays in the service area of the terrestrial based mobile communication system but in a building or his house which intercepts signals from the base station 3, direct communications from the portable terminal 5 to the base station 3 cannot be performed. In FIG. 3, since the portable terminal 5 is placed in a room of a building or user's house where it cannot directly access the base station 3, it accesses the antenna 7 of the transportable earth station 4 via the radio channel 8. In this case, the transportable earth station 4 is placed, for example, by any window of a room where communications with the base station 3 are possible. The transportable earth station 4 receives the signal from the portable terminal 5 by the antenna 7 and transmits therethrough the signal to the base station 3 after amplifying the signal power. In a return link the signal from the base station 3 is similarly received by the antenna 7 of the earth station 4 and is sent via the antenna 7 to the portable terminal 5 after being converted to a very weak power signal.

Figure 4:
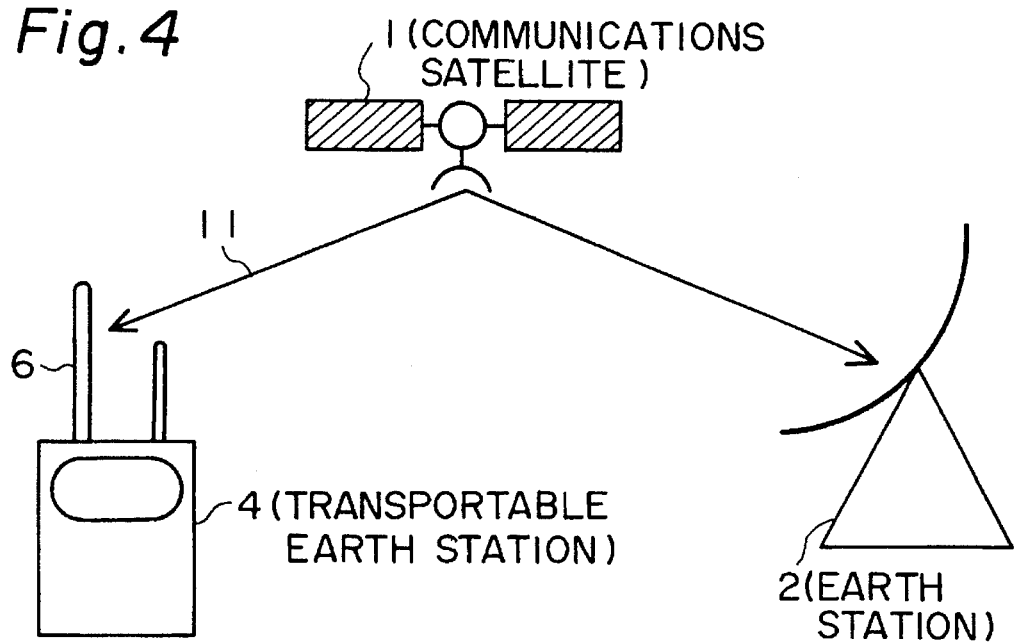
FIG. 4 is a diagram illustrating another embodiment of the satellite/land mobile communication system integration scheme according to the present invention when it is applied to a mobile satellite communication system.

FIG. 4 shows the mode of communication by this invention system in case of using the transportable earth station 4 in the mobile satellite communication system. In FIG. 4, the transportable earth station 4 is an ordinary earth station which is conformable to the specifications of the mobile satellite communication system and is capable of communications with the land or earth station 2 via the communications satellite 1 by the use of a radio channel 11. By this, the user of portable terminal 5, whether inside or outside the service area of the terrestrial based mobile communication system, is allowed to communicate with the earth station 2 from anywhere in the world as long as the satellite 1 is visible therefrom.

Figure 5:
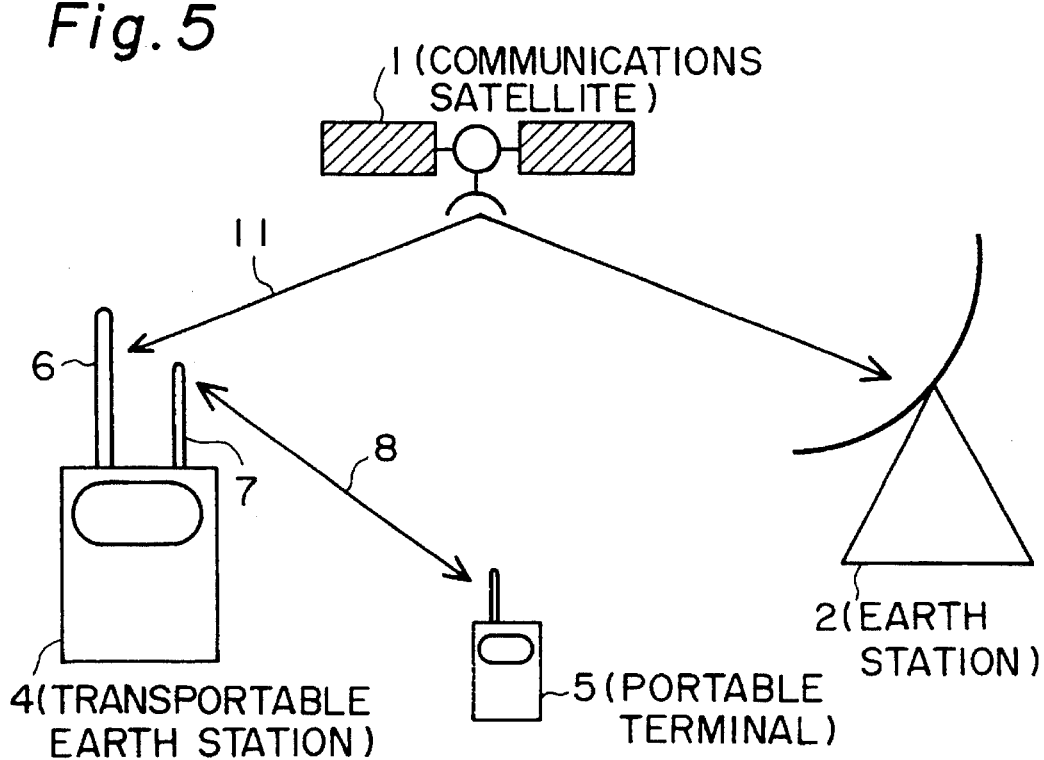
FIG. 5 is a diagram illustrating another embodiment of the satellite/land mobile communication system according to the present invention when it is used in a room or similar situation where usual mobile satellite communication system cannot be used.

FIG. 5 shows another example of application of this invention in a case where the transportable earth station 4 is placed at a specific position where the satellite 1 is visible from the user of portable terminal 5, (for example, at the window through which the satellite 1 can be seen when the user of portable terminal 5 stays in a building or his house) and the portable terminal 5 is used to communicate with the satellite 1. In FIG. 5, the transportable earth station 4 is fixed at the position from which the satellite 1 can be seen and the portable terminal 5 accesses the transportable earth station 4 by a very weak radio wave from the portable terminal 5 via the radio channel 8 so as to access the mobile satellite communication system. The transportable earth station 4 receives the signal from the portable terminal 5 by the antenna 7, converts it to the communication frequency of the mobile satellite communication system and amplifies it, thereafter transmitting the signal via the antenna 6 to the satellite 1.

On the other hand, a forward link signal 11 from the earth station 2, relayed by the satellite 1, is received by the antenna 6 of the transportable earth station 4 and is converted to the communication frequency of the terrestrial based mobile communication system, thereafter being sent as a very weak radio wave signal to the portable terminal 5. By using the transportable earth station 4 as a repeating base station in this way, the portable terminal 5 is allowed to perform mobile satellite communications in the area where it can communicate with the transportable earth station 4.

Figure 6:
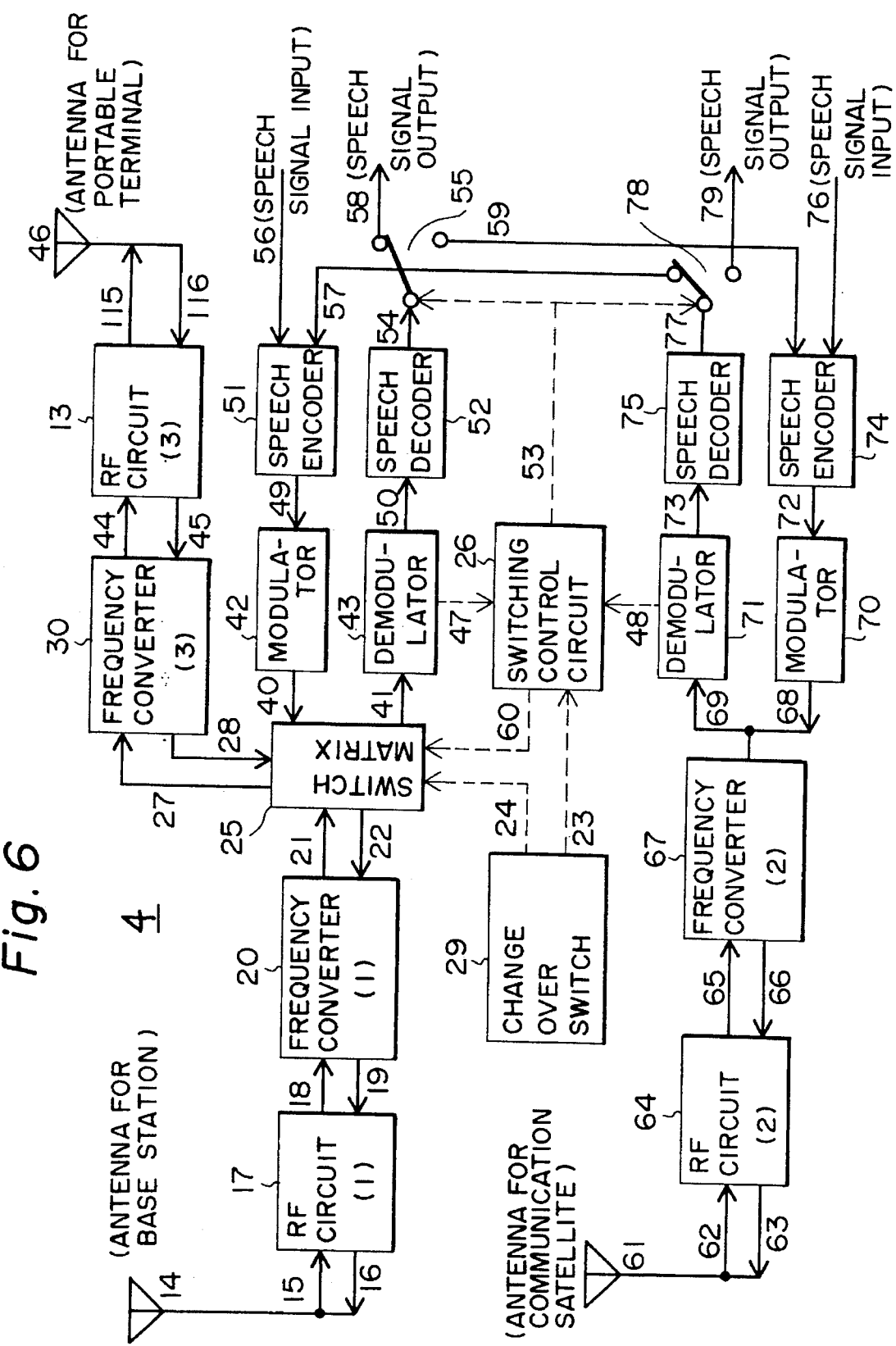
FIG. 6 is a diagram illustrating an example of the construction of a transportable earth station for use in the satellite/land mobile communication system integration scheme according to the present invention.

FIG. 6 illustrates in block form an embodiment of the transportable earth station 4 for use in the system of the present invention and FIG. 7 an embodiment of the portable terminal 5 for use in the system of the present invention.

A description will be given, with reference to FIGS. 6 and 7, of examples of operation of the transportable earth station 4 and the portable terminal 5 in the embodiments of FIGS. 2 through 5.

(1) For communications between the portable terminal 5 and the base station 3 of terrestrial based mobile communication system (FIG. 2):

In FIG. 7, a radio-frequency (RF) circuit switching controller 109 of the portable terminal 5 normally controls a change-over switch 88 to input an intermediate-frequency (IF) signal 97 received from a frequency converter (1) 96 into a demodulator 101 so as to receive control signals which are always sent from the base station 3 of terrestrial based mobile communication system (hereinafter refers to "base station") at fixed time intervals. When no control signals from the base station 3 can be received for a fixed period of time, that is, when a digital control signal 105 from the demodulator 101 is not input into the RF circuit switching controller 109, the controller 109 switches the change-over switch 88 to a frequency converter (3) 84 (this operation is repeated).

Next, when communication is performed between the portable terminal 5 and the base station 3, the RF circuit switching controller 109 controls a change-over switch 87 to connect a modulator 100 to an input line 89 of the frequency converter (1) 96. A speech signal input 107 is digitally compressed by a speech encoder 103 and is converted by the modulator 100 to a modulated signal carrier defined by the specifications of the terrestrial based mobile communication system. This modulated baseband signal is converted by the frequency converter (1) 96 to an intermediate-frequency (IF) signal, which is further converted by an RF circuit (1) 93 to an RF signal, which is amplified and then transmitted as an RF signal to the base station 3 via a transmit/receive antenna 90 for base station.

Conversely, an RF signal sent from the base station 3 is received by the transmit/receive antenna 90 and is converted by the RF circuit (1) 93 to an IF signal 94, which is converted by the frequency converter (1) 96 to a baseband signal. Furthermore, this baseband signal is input via the change-over switch 88 into the demodulator 101 for conversion to a digital signal, which is output as an analog speech signal output 108 from a speech decoder 106.

In such a way as mentioned above, the portable terminal 105 and the base station 3 communicate with each other.

(2) For communications between the portable terminal 5 and the base station 3 via the transportable earth station (FIG. 3):

In FIG. 3, since the portable terminal 5 is held in a room of a building or user's house where no control signal from the base station 3 can be directly received, it cannot receive the control signal from the base station 3 for a fixed period of time, that is, the digital control signal 105 from the demodulator 101 is not input into the RF circuit switching controller 109 in FIG. 7, and consequently, the change-over switch 88 is switched to the frequency converter (3) 84 by the controller 109.

On the other hand, the transportable earth station 4 is disposed at the place where it can directly receive the control signal from the base station 3, and by putting a change-over switch 29 for mutually selecting portable terminal/transportable earth stations in a portable terminal mode, a switch matrix 25 is set so that a frequency converter (3) 30 and a frequency converter (1) 20 in FIG. 6 are mutually interconnected. In this instance, however, the frequency converter (1) 20 and a demodulator 43 are mutually connected by the switch matrix 25 to a line 21 and a line 41, respectively, making it possible to monitor signals from the base station 3 at all times. At this time, the RF signal from the base station 3 is received by a transmit/receive antenna 14 for base station and is converted by an RF circuit (1) 17 to an IF signal 18, thereafter being converted by the frequency converter (1) 20 to a baseband signal. This baseband signal is input via the switch matrix 25 into the frequency converter (3) 30 for conversion to an IF signal 44, which is input into an RF circuit (3) 13, thereafter being transmitted as a very weak power wave to the portable terminal 5 via a transmit/receive antenna 46 for portable terminal for communication between the transportable earth station 4 and the portable terminal 5. This very weak power wave is received by a transmit/receive antenna 81 of the portable terminal 5 for for communication with the transportable earth station 4 and is converted by an RF circuit (3) 112 and the frequency converter (3) 84 to a baseband signal 86. This baseband signal is input via the change-over switch 88 into the demodulator 101 for conversion to a digital signal, which is output as the analog speech signal output from the speech decoder 106.

Conversely, for transmitting a signal from the portable terminal 5 to the base station 3, the speech signal input 107 is digitally compressed by a speech encoder 103 and is converted by the modulator 100 to a modulated signal carrier defined by the specifications of the terrestrial based mobile communication system. This modulated baseband signal is input via the change-over switch 87 into the frequency converter (3) 84 and is converted by the frequency converter (3) 84 and the RF circuit (3) 112 to an RF signal, thereafter being transmitted as a very weak power signal to the transportable earth station 4 via the transmit/receive antenna 81 for transportable terminal for communication between the transportable earth station 4 and the portable terminal 5.

On the other hand, the transportable earth station 4 in FIG. 3 receives the very weak power signal from the portable terminal 5 by the transmit/receive antenna 46 for portable terminal for communication between the transportable earth station 4 and the portable terminal 5, and the received signal is converted by the RF circuit (3) 13 and the frequency converter (3) 30 to a modulated baseband signal. This modulated baseband signal is converted again by the frequency converter (1) 20 to an IF signal, which is further converted by the RF circuit (1) 17 to an RF signal, which is amplified and then transmitted via the transmit/receive antenna 14 to the base station 3 in FIG. 3.

In such a way as described above, the portable terminal 5 and the base station 3 communicate with each other via the transportable earth station 4. To communicate directly with the base station 3 through the use of the transportable earth station 4 without using the portable terminal 5, it is necessary only to put change-over switch 29 of manually selecting portable terminal/transportable earth stations in the transportable earth station mode and control the switch matrix 25 by a switch matrix control signal 24 so that the modulator 42 and the demodulator 43 are connected to the frequency converter (1) 29. In this case, a mobile terminal select information signal 23 from the change-over switch 29 is fed to a satellite/land switching control circuit 26 to control a change-over switch 55 to interconnect lines 54 and 58 so that a speech signal output is provided directly from a built-in speaker.

(3) For communications between the transportable earth station and the earth station of mobile satellite communication system (FIG. 4):

At first, the change-over switch 29 in FIG. 6 is set to the transportable earth station mode for communication between the transportable earth station 4 and the earth station 2 via the communications satellite 1. At this time, the mobile terminal selecting information signal 23 is fed from the change-over switch 29 to the satellite/land switching control circuit 26, setting the change-over switches 55 and 78 to isolate transmit/receive circuits of the terrestrial based mobile communication system and the mobile satellite communication system from each other. Incidentally, the switch matrix 25 is controlled so that the modulator 42 and the demodulator 43 are both connected to the frequency converter (1) 20.

By the above operations, the user having the transportable earth station 4, whether inside or outside the service area of the terrestrial based mobile communication system, is allowed to communicate with the earth station 2 from anywhere in the world as long as the satellite 1 can be seen therefrom. It is also possible to assign priorities to the communication systems so that when the transportable earth station 4 is in its stand-by state, the communication system which has received a call set-up signal from the base station 3 or the earth station 2 earlier than the other communication system is preferentially used.

(4) For communications between the portable terminal and the earth station of mobile satellite communication system (FIG. 5):

In FIG. 5, since the portable terminal 5 is held in a room of a building or user's house where no control signals can be received directly from the base station 3, it cannot receive the control signal from the base station 3 for a fixed period of time, that is, the digital control signal 105 from the demodulator 101 in FIG. 7 is not input into the RF circuit switching controller 109, and consequently, the change-over switch 88 is switched to the frequency converter (3) 84 by the RF circuit switching controller 109.

On the other hand, the transportable earth station 5 is disposed at the place where it can directly receive the control signal from the earth station 2, and by putting the change-over switch 29 in the portable terminal mode in FIG. 6, the switch matrix 25 is set so that the frequency converter (3) 30 and the frequency converter (1) 20 are connected to each other. In this instance, the frequency converters (3) 30 and (1) 20 have their lines 21 and 28 connected to the line 41 of the demodulator 43 via the switch matrix 25. This allows signals from the portable terminal 5 to be monitored by the satellite/land switching control circuit 26 at all times. In this situation, the very weak power signal from the portable terminal 5, which contains a mobile satellite communication telephone number information, is received by the transmit/receive antenna 46 for portable terminal for communication between transportable earth station 4 and the portable terminal 5. The received signal is converted by the RF circuit (3) 13 to an IF signal 45, which is further converted by the frequency converter (3) 30 to a baseband signal 28. The baseband signal 28 is fed via the switch matrix 25 to the demodulator 43, wherein it is demodulated to a digital control signal. The digital control signal 47 is sent to the satellite/land switching control circuit 26, wherein it is recognized to be a telephone number for the mobile satellite communication system. As the result of this, the change-over switches 55 and 78 are controlled to interconnect the lines 54 and 59 and lines 77 and 57, respectively, and the frequency converter (3) 30 and the modulator 42 (i.e. lines 27 and 40) are interconnected by a switch matrix control signal 60, while at the same time the frequency converter (1) 20 and the demodulator 43 (i.e. lines 21 and 41) are disconnected from each other. When the very weak power signal from the portable terminal 5 contains a telephone number for the terrestrial based mobile communication system, operations reverse from those described above are performed. In practice, the terrestrial based mobile communication system and the mobile satellite communication system employ different information transmission rates, frame formats and data coding schemes and it is necessary to use interfaces for matching them, but the following description will be given of the transmission of the speech signal on the assumption that such interface are included in speech encoders 51 and 74 and speech decoders 52 and 75 in FIG. 6.

Next, a digital speech signal demodulated by the demodulator 43 is once converted by the speech decoder 52 to the original analog speech signal. The analog speech signal, identified by 54, is fed via the change-over switch 55 to the speech encoder 74 of a tranceiver of mobile satellite communication system, wherein it is digitally compressed, thereafter being converted by a modulator 70 to a modulated signal carrier defined by the specifications of the mobile satellite communication system. This modulated baseband signal is fed to a frequency converter (2) 67 and an RF circuit (2) 64, after which it is transmitted as an RF signal to the communications satellite 1 via a transmit/ receive antenna 61 for communication satellite.

Conversely, an RF signal from the earth station 2 is received by the transmit/receive antenna 61 and is converted by the RF circuit (2) 64 and the frequency converter (2) 67 to a baseband signal, which is demodulated by a demodulator 71 to a digital signal, which is output as an analog speech signal 77 from the speech decoder 75. The analog speech signal 77 is provided via the change-over switch 78 to the speech encoder 51 of the transceiver circuit of terrestrial based mobile communication system, wherein it is digitally compressed, thereafter being converted by the modulator 42 to a modulated signal carrier defined by the specifications of the terrestrial based mobile communication system. This modulated baseband signal is fed via the switch matrix 25 to the frequency converter (3) 30 and the RF circuit (3) 13, whereby it is converted to an RF signal, thereafter being transmitted as a very weak power signal to the portable terminal 5 via the transmit/receive antenna 46 for communications between the transportable earth station 4 and the portable terminal 5. The very weak power signal is received by the transmit/ receive antenna 81 of the portable terminal 5 and is converted by the RF circuit (3) 112 and the frequency converter (3) 84 to a baseband signal 86. This baseband signal is input via the change-over switch 88 into the demodulator 101 for conversion to a digital signal, which is output as the analog speech signal output 108 from the speech decoder 106.

With such a construction as described above, communications are performed between the portable terminal 5 and earth station 2 via the transportable earth station 4. To communicate directly with the earth station 2 from the transportable earth station 4 without using the portable terminal 5, it is necessary only to put the change-over switch 29 in the transportable earth station mode. By this, the mobile terminal select information signal 23 from the change-over switch 29 is provided to the satellite/land switching control circuit 26, which controls the change-over switch 78 to interconnect the lines 77 and 79 so that the speech signal output from the earth station 2 is obtained directly from the built-in speaker.

While in FIGS. 6 and 7 the antennas and the intermediate-frequency (IF) circuits are shown to be prepared separately of the circuit elements for both of the terrestrial based mobile communication system and the mobile satellite communication system so as to facilitate a better understanding of the communication between the transportable earth station 4 and the portable terminal 5, it is technically possible, in practice, to share these elements by the both systems. Besides, for the sake of brevity, the embodiments have been described to use the manually selective type portable terminal/transportable earth station change-over switch 29 specifically provided, but it is obvious it is possible to use various change-over control methods such as a remote control operation from the portable terminal 5 and automatic setting of the transportable earth station 4 by a very weak power call signal from the portable terminal 5.

As described above in detail, the system according to the present invention possesses such advantages as listed below.

(1) Even in a room, it is possible to access both of the base station of the terrestrial based mobile communication and the satellite from the portable terminal even in a room. This enhances the transportability of the communication terminal and its ease of use.

(2) By connecting the transportable earth station and the portable terminal with interfaces identical with air interfaces of the terrestrial based mobile communication system, it is possible to minimize the equipment load on the portable terminal.

(3) The use of very weak radio signal carrier for connecting the transportable earth station and the portable terminal precludes the possibility of interference with existing radio communication systems and avoids the necessity of taking procedures following the radio wave law.

(4) The transportable earth station need not be carried at all times when the portable terminal is used in the service area of the terrestrial based mobile communication system.

(5) No interference with other radio communication systems is caused.

(6) The power dissipation of the portable terminal can be cut.

What we claim is:

1. A satellite/land mobile communication system integration scheme for a mobile communication system comprising a transportable earth station for communicating with both of a mobile satellite communication system and a terrestrial based mobile communication system, and a hand-held portable terminal for radio communication with said transportable earth station and used in said terrestrial based mobile communication system, wherein communications between said portable terminal and said transportable earth station are performed using interfaces identical with radio interfaces adopted in said terrestrial based mobile communication system, whereby when said portable terminal is allowed to communicate directly with a base station of said terrestrial based mobile communication system, ordinary transmitting power is used for communication;

wherein when said portable terminal is not allowed to communicate directly with said base station of said terrestrial based mobile communication system, a very weak radio wave is used to interconnect said portable terminal and said transportable earth station for communication with said base station via said transportable earth station; and wherein when said portable terminal performs communication in said mobile satellite communication system, said portable terminal is connected by the very weak radio wave to said transportable earth station for communication therethrough with said mobile satellite communication system, thereby enabling both of said terrestrial based mobile communication and said mobile satellite communication system to be accessed by only one portable terminal.

2. A satellite/land mobile communication system integration method for a mobile communication system, comprising a transportable earth station for communicating with both of a mobile satellite communication system and a terrestrial based mobile communication system, and a hand-held portable terminal for radio communication with said transportable earth station and used in said terrestrial based mobile communication system, said method comprising:

performing communications between said portable terminal and said transportable earth station using interfaces identical with radio interfaces adopted in said terrestrial based mobile communication system, whereby when said portable terminal is allowed to communicate directly with a base station of said terrestrial based mobile communication system, ordinary transmitting power is used for communication;

using a very weak radio wave to interconnect said portable terminal and said tranportable earth station for communication with said base station via said transportable earth station when said portable terminal is not allowed to communicate directly with said base station of said terrestrial based mobile communication system; and connecting said portable terminal by the very weak radio wave to said transportable earth station for communication therethrough with said mobile satellite communication system when said portable terminal performs communication in said mobile satellite communication system, thereby enabling both of said terrestrial based mobile commmunication system and said mobile satellite communication system to be accessed by only one portable terminal.

* * * * *